US006749383B1

(12) United States Patent
Benedict et al.

(10) Patent No.: US 6,749,383 B1
(45) Date of Patent: Jun. 15, 2004

(54) TRACK MOUNTED STANCHION AND CLAMP ASSEMBLIES FOR STORAGE AND DUNNAGE SYSTEMS

(75) Inventors: Charles E. Benedict, Tallahassee, FL (US); William P. Thompson, Tallahassee, FL (US); Stephen R. Corbett, Tallahassee, FL (US); James R. Dobbs, Tallahassee, FL (US); Scott K. Bladen, Tallahassee, FL (US)

(73) Assignee: Benedict Engineering Co., Tallahassee, FL (US)

( * ) Notice: Subject to any disclaimer, the term of this patent is extended or adjusted under 35 U.S.C. 154(b) by 0 days.

(21) Appl. No.: 10/040,943

(22) Filed: Jan. 9, 2002

Related U.S. Application Data
(60) Provisional application No. 60/260,206, filed on Jan. 9, 2001.

(51) Int. Cl.[7] .................................................. B60Q 7/08
(52) U.S. Cl. ........................ 410/153; 410/143; 410/144; 410/150; 410/138
(58) Field of Search .................................. 410/153, 143, 410/144, 150, 130, 132, 137, 138, 139, 141, 142; 211/105.1; 248/351

(56) References Cited

U.S. PATENT DOCUMENTS

| | | | | | |
|---|---|---|---|---|---|
| 1,665,439 | A | * | 4/1928 | Brown | 410/150 |
| 3,073,260 | A | * | 1/1963 | Dunlap et al. | 410/153 |
| 3,570,412 | A | * | 3/1971 | Holman, Jr. | |
| 4,208,970 | A | * | 6/1980 | Matyas | 410/153 |
| 4,294,569 | A | * | 10/1981 | Lewis et al. | 410/133 |
| 4,702,653 | A | * | 10/1987 | Gaulding et al. | 410/144 |
| 4,722,646 | A | * | 2/1988 | McIntyre | 410/138 |
| 5,370,482 | A | * | 12/1994 | Long | 410/153 |
| 5,688,087 | A | * | 11/1997 | Stapleton et al. | 410/150 |
| 5,944,464 | A | * | 8/1999 | Cole, Jr. | 410/153 |
| 6,068,433 | A | * | 5/2000 | Baloga | 410/145 |
| 6,186,715 | B1 | * | 2/2001 | Oliviero | 410/151 |
| 6,238,154 | B1 | * | 5/2001 | DaPrato | 410/151 |

* cited by examiner

*Primary Examiner*—Stephen T. Gordon
(74) *Attorney, Agent, or Firm*—Dowell & Dowell, P.C.

(57) ABSTRACT

Stanchion and clamp assemblies which are moveable along a track system in a cargo storage area and which are pivotally and/or extendably adjustable relative to cargo or dunnage after being initially secured to the track system to thereby permit positive engagement of the stanchion and clamp assemblies with the cargo or dunnage and thus prohibit cargo or dunnage shifting.

20 Claims, 6 Drawing Sheets

TRACK MOUNTED STANCHION AND CLAMP ASSEMBLIES FOR STORAGE AND DUNNAGE SYSTEMS

CROSS REFERENCE TO RELATED APPLICATION

This application claims the benefit of U.S. Provisional Patent Application, Serial No. 60/260,206 which was filed on Jan. 9, 2001 and entitled TRACK MOUNTED STANCHION AND CLAMP ASSEMBLIES FOR STORAGE AND DUNNAGE SYSTEMS with the same inventors.

BACKGROUND OF THE INVENTION

FIELD OF THE INVENTION

This invention is generally directed to stanchion and clamping devices which are mounted to be adjustably movable along tracks for securing cargo in transport vehicles including ships, aircraft, trucks and the like. More specifically, the invention is directed to vertical stanchions which are supported by shuttles or carriers so as to be movable along a track system within a cargo or storage area and wherein horizontal adjustment of each stanchion is possible by either pivotal movement of the stanchion or camming adjustment of the stanchion relative to the guide tracks after the stanchion has been moved into close proximity to cargo which is to be secured. The invention is further directed to clamp assemblies which may be used in cooperation with the stanchions in order to secure cargo which is out of vertical alignment when stacked within a storage or cargo holding area.

SUMMARY OF THE INVENTION

The present invention includes stanchion and clamp assemblies used in cooperation with upper and lower generally aligned guide tracks which are provided within a cargo storage or holding area in a predetermined pattern. Each stanchion is carried or mounted to a shuttle or moveable carrier disposed within the upper, lower or both the upper and lower guide tracks so that the weight of each stanchion is fully supported by the shuttles or carriers thereby allowing ease of movement of the stanchion within the storage or cargo holding area.

In each embodiment of the invention, the stanchion includes a vertically extending body member having upper and lower ends and oppositely facing load engaging surfaces. Each body member is locked into position relative to the guide tracks by extendable locking pins or similar elements which are extendable by way of an operating handle connected through a linkage system to the pins. The pins are selectively extended outwardly relative to the upper and lower ends of the body to engage within holes, slots, teeth or other openings provided along the length of each guide track. In preferred embodiments, the linkage system connecting the operating handle to the locking pins is designed to automatically hold or lock the pins when they are extended into locking relationship with respect to the guide tracks or retracted therefrom.

In a first embodiment of the invention, the body of each stanchion is fixedly connected to a support shuttle or carriage either along the upper, lower or both upper and lower ends thereof. In this respect, it should be noted that for purposes of example, the present application describes the stanchions as being supported primarily by upper support carriers or shuttles, however, as previously mentioned, the stanchions may be supported by lower shuttles or by combinations of upper and lower shuttles and remain within the teachings of the invention.

In the first embodiment, the body of each stanchion is mounted to the shuttle by a connecting element which is positioned off-center with respect to the vertical centerline or vertical elongated axis of the body of the stanchion with the upper locking pin being positioned on one side of the connecting element toward one load engaging surface of the stanchion and the lower locking pin being mounted so as to be slideably extendable adjacent the opposite load engaging surface of the stanchion and generally in line with the axis of the connecting element. By this arrangement, by pivoting or rotating the stanchion about its longitudinal axis, an incremental horizontal adjustment of the positioning of the stanchion in accomplished as the upper and lower locking pins are selectively aligned with respect to holes or other cooperating pin engaging surfaces or elements of the guide tracks. Thus, an incremental adjustment in the horizontal positioning of each stanchion may be made by selective rotation of the stanchion about its axis when positioning the stanchion relative to cargo within a storage area.

In a variation of the first embodiment of the invention, the body of each stanchion is mounted to the connecting element of each carrier such that the locking pins and the connecting element of the shuttle are symmetrically spaced horizontally with respect to one another but are asymmetrically positioned relative to the width of the body member between the front and rear cargo engaging surfaces thereof. In this manner, each stanchion may be rotated about its central vertical axis to essential "walk" the stanchion to align the locking pins relative to spaced openings or other locking elements associated with the guide tracks in order to facilitate the optimum positioning of the stanchion relative to or against cargo within a storage or holding area.

In each of the variations of the first embodiment of the invention, the varied spacing between the upper and lower locking pins and the pivotable axis of the stanchion permits a horizontal adjustment to be achieved depending upon how each stanchion is oriented, such that pivoting the stanchion about it's axis in a first direction causes the locking pins to align in a first position relative to the axis whereby the opposite rotation causes a varied positioning of the locking pins relative to the central axis of the body.

In a second embodiment of the invention, the body of each stanchion is mounted to its respective carrier or shuttle in such a manner that the body is horizontally adjustable or moveable relative to the connecting element of the shuttle. Further, each of the upper and lower locking pins are provided with a cam surface which cooperatives with a guide element of the body, such that when the locking pins are positioned adjacent to cargo and extended so as to engage within holes or other cooperative locking elements of the guide tracks, the pins may thereafter be rotated to cam the body horizontally toward the cargo. The floating relationship between the body of the stanchion and the connecting elements of each shuttle allows a final adjustment to be made without requiring further adjustment of the shuttle relative to the guide tracks.

In each of the embodiments of the present invention the bodies of the stanchions will be shown and described as being essentially in "I" beam configuration having oppositely oriented load engaging flanges and a central web to which a linkage assembly and the locking pins are guidingly secured. It should be noted that other configurations of beams or structures may be utilized for the body of the stanchions and remain within the teachings of the invention.

By way of example, the bodies may be rectangular, square, oval or circular in cross-section.

In the preferred embodiments, the load engaging flanges or surfaces of each stanchion are provided with a plurality of vertically spaced keyhole-shaped slots or openings which are specifically designed to support clamp assemblies which may be mounted in a desired position along the vertical height of each stanchion. The clamp assemblies may be varied in configuration but are designed to be horizontally adjustable after being positioned either along the front or rear load engaging surface of the stanchions. In this respect, when a stanchion is positioned and locked to the guide tracks adjacent cargo which is stacked vertically, it is possible that some of the cargo will not be vertically aligned with other of the cargo in a stack. To secure cargo which is not vertically aligned and which therefore does not engage a surface of the body of a stanchion, the clamp assemblies may be mounted and extended so as to contact such elements of cargo in order to securely retain the cargo and prevent its shifting during movement of a transport carrier. One preferred type of clamp assembly will be described with respect to the invention, however, other assemblies may be used. In the preferred embodiment disclosed, the clamp assembly includes two body portions which are slidable across a diagonal interface such that, by adjusting bolts or screws, the body of the clamp assembly is expanded or retracted.

It is a primary object of the present invention to provide stanchions which may be used in substantially any cargo storage area on transport vehicles to prevent cargo from shifting during movement of the vehicle. The vehicle may include ships, airplanes, trucks and the like. The stanchions are used in cooperation with upper and lower guide tracks having openings or configurations which permit a selective locking of the stanchions relative to the guide tracks and wherein the stanchions may thereafter be adjusted horizontally by either walking or pivoting of the stanchions to advance the stanchions towards cargo to be secured or by camming the body of each stanchion relative to the guide tracks to provide for horizontal adjustment to ensure that cargo is securely engaged to prevent its movement.

It is also an object of the present invention to provide stanchions which may be utilized with adjustable clamp assemblies such that stacked cargo can be securely engaged when the cargo is not vertically aligned and whereby the stanchions may be engaged against portions of stacked cargo and clamp assemblies supported on the stanchions to engage non-aligned cargo to prevent cargo shifting during movement of a carrier vehicle.

It is another object of the present invention to provide a system of stanchions for use in cargo storage areas and especially in areas where heavy cargo is stored, such as in military ships wherein missiles, bombs and other devices must be safely and securely stored, wherein the stanchions may be easily moved and maneuvered by a single individual so as to be positioned and locked relative to the cargo in such a manner that cargo can not shift during movement of the ship.

BRIEF DESCRIPTION OF THE DRAWINGS

A better understanding of the invention will be had with respect to the attached drawings wherein.

DESCRIPTION OF THE PREFERRED EMBODIMENTS

Figure 1:
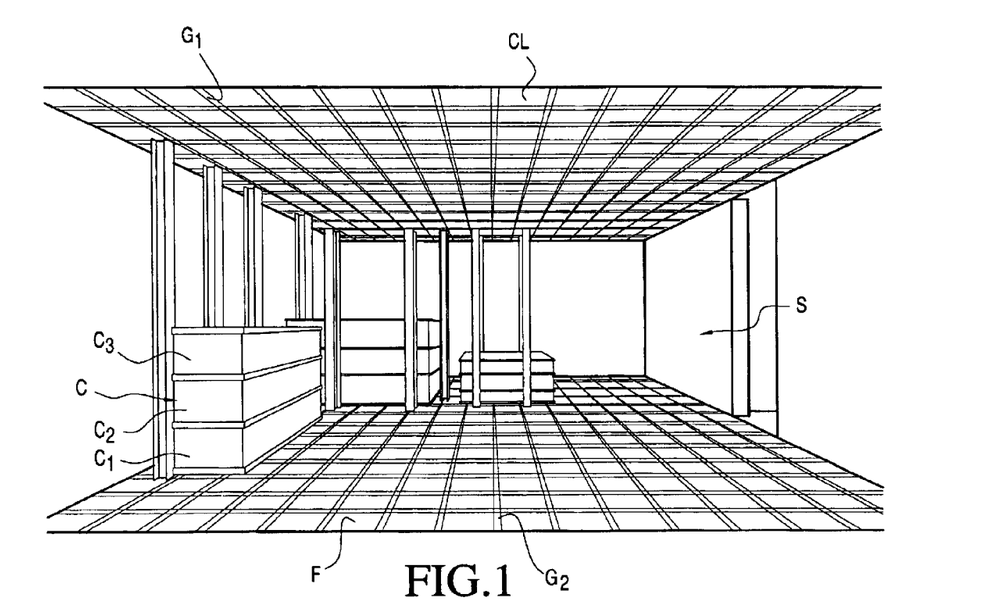
FIG. 1 is a perspective illustrational view of a storage area or cargo hold having upper and lower guide tracks in accordance with the teachings of the present invention and showing stanchions similar to those to be described herein mounted to secured cargo during shipment.
Figure 2:
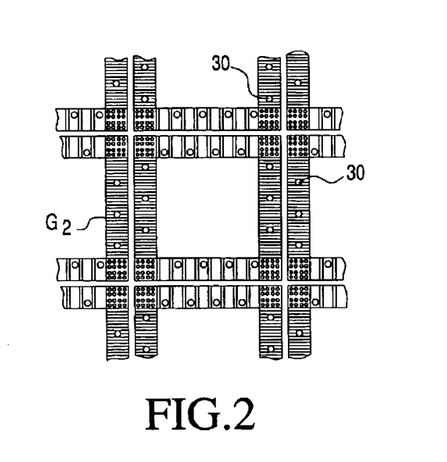
FIG. 2 is an illustration of one possible grid pattern for the guide tracks of the present invention.
Figure 3:
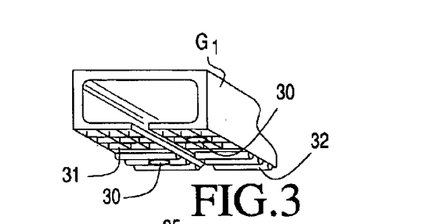
FIG. 3 is a front perspective view of one example of an upper guide track in accordance with the invention.
Figure 4:
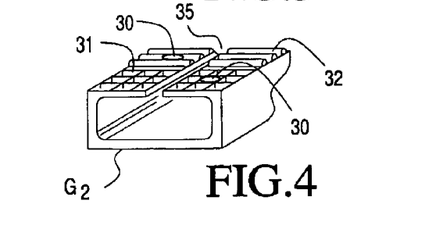
FIG. 4 is a front perspective view of one example of a lower guide track in accordance with the invention.

With continued reference to the drawing figures and particular FIGS. 1–4, the invention is directed to stanchions for use in securing cargo "C" within a cargo or storage area "S" of a carrier such as a ship, aircraft, truck or the like. In the preferred embodiments, the stanchions are designed to be utilized with guide tracks "G1" and "G2" which are provided in intersecting patterns along a ceiling "CL" and floor "F" of the storage area. In some embodiments of the invention, the guide tracks may be generally C-shaped, as shown in FIGS. 3 and 4, so as to allow shuttles, carriers or carriages, as will be described in greater detail herein, to travel within the guide tracks to support the stanchions of the invention from the upper, lower or both the upper and lower guide tracks. As shown in FIG. 1, the guide tracks are provided in the storage area in a uniform pattern with the embodiment being laid out in generally square grid configuration. The pattern may vary depending upon the cargo and type of carrier. In this respect, the configuration of the guide tracks and the orientation of the guide tracks may vary and yet be within the teachings of the invention. It is only necessary to provide a system which will permit movement of the stanchions of the invention relative to the upper and lower guide tracks "G1" and "G2" such that the stanchions may be moved to various locations throughout the storage area "S".

In preferred embodiments, the guide tracks include spaced locking holes or openings 30 which are provided in opposite flanges 31 and 32 defined by the guide tracks or rails "G1" and "G2". The guide tracks need not be separately formed but may be formed as part of the ceiling or floor structure of the storage area. In this respect, the floor and ceiling may be formed of panels defining a series of open channels in a grid pattern similar to that shown in FIG. 1 and, where necessary, openings, such as shown at 30, may be made directly on opposite sides of the channels defined in the floor and/or ceiling structure.

The present invention is directed to providing movable stanchions which are used to replace more conventional non-adjustable or movable stanchions including wooden dunnage, wooden wedges, chains, straps and other tie-downs. The stanchions of the invention accommodate wide varieties of cargo arrangements, cargo configurations and cargo weights such that they may be used for securing small goods or may be used in military vessels for anchoring heavy loads including missile containers, bomb clusters, pallets of machinery and the like without fear of the stanchions failing during use.

With specific reference to FIGS. 5–9, a first embodiment of the invention is disclosed in detail. In this embodiment, the stanchion 40 is in the form of a "I" beam configuration having a rear load engaging flange 41 and spaced front load engaging flange 42 both of which are designed to abut cargo such as shown at "$C_1$", "$C_2$" and "$C_3$" in FIG. 1. The flanges 41 and 42 are joined by a central web 43 and define with the web a vertical body 44 of the stanchion which extends from a lower end 45 to an upper end 46.

Figures 5, 6, 7, 8, 9:
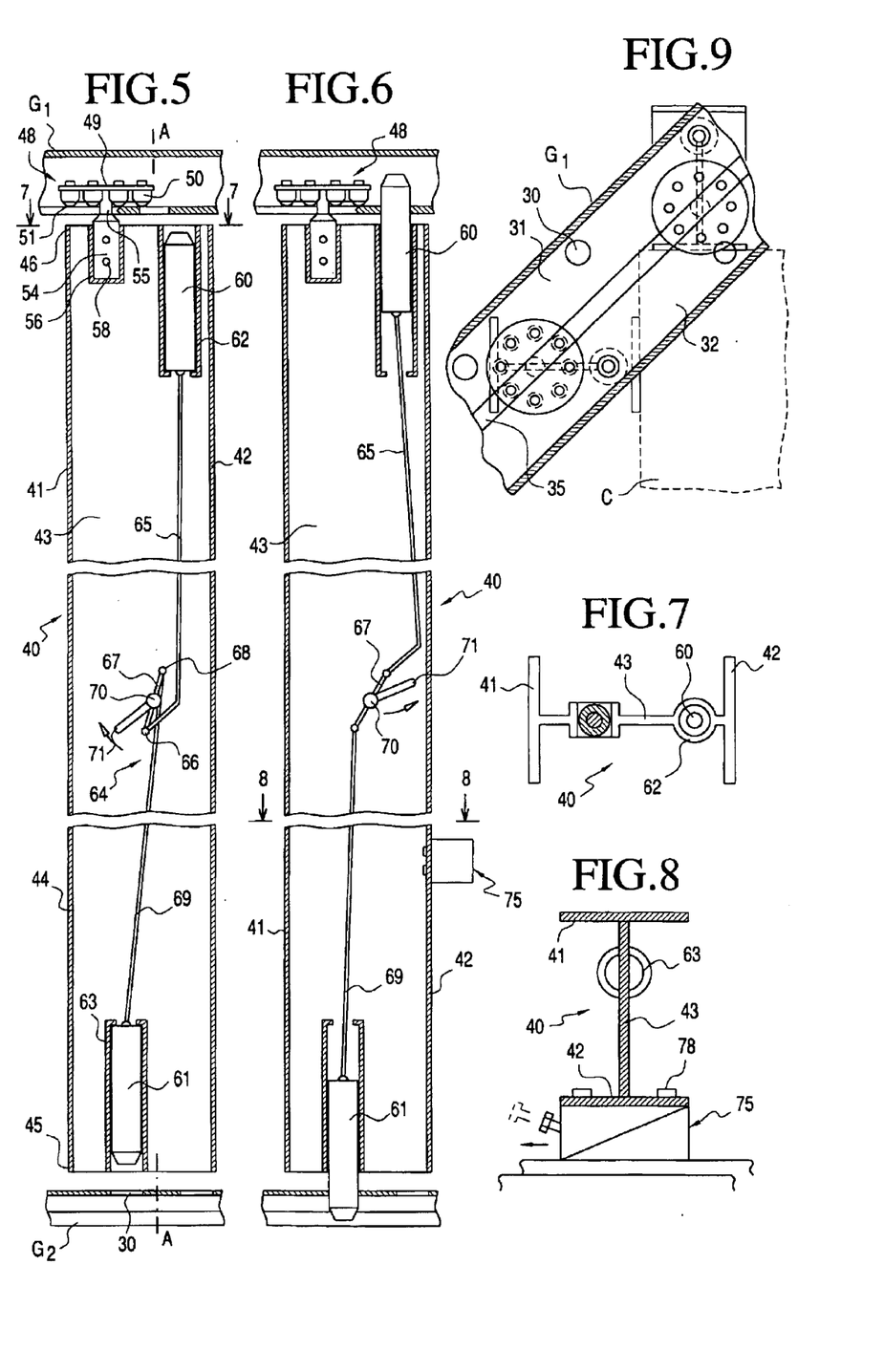
FIG. 5 is a side, partial cross-sectional view, having portions broken away, of a first embodiment of the invention illustrating the stanchion be carried relative to upper and lower guide tracks such as shown in FIG. 1.
FIG. 6 is a view similar to FIG. 5 showing the upper and lower locking pins of the stanchion being extended to lock the stanchion in position relative to the upper and lower guide tracks.
FIG. 7 is a cross-sectional view taken along line 7—7 of FIG. 5.
FIG. 8 is a cross-sectional view taken along line 8—8 of FIG. 6 and showing an optional clamp assembly being connected to the stanchion.
FIG. 9 is a top plan illustrational view showing two stanchions, such as shown at FIG. 5, maneuvered so as to engage cargo relative to the upper guide tracks.

In the present embodiment, the body 44 is connected to a shuttle or carrier 48 which is mounted within the upper guide track "G1" of the guide track system so as to be supported slightly above the lower guide track "G2". As previously noted, the body 44 could also be supported by a carrier or shuttle mounted within the lower guide track "G2" or by two carriers mounted both within the upper and lower guide tracks "G1" and "G2".

The carrier 48 includes a generally circular base 49 having a plurality of generally cylindrical housings 50 mounted thereto in which ball rollers 51 are disposed so as to be engageable with the opposing flanges 31 and 32 of the guide track "G1" on opposite sides of an elongated central opening 35 in the guide track. The carrier 48 is connected to the body 44 by connector 54 having a spindle portion 55 which extends through the channel 35 and which is secured to the base 49. The size of the spindle 55 is generally substantially equal to the width of the channel 35 so that there is a guiding relationship defined by the opposite flanges 31 and 32 of the guide track with respect to the carrier 48. As opposed to the ball roller assemblies shown in the drawing figures, other types of low friction support members may be provided on the carrier to allow relative movement of the carrier with respect to the guide tracks "G1" and "G2".

As noted with respect of FIG. 5, the connecting element 54 between the carrier 48 and the body 44 of the stanchion 40 is offset laterally with respect to an elongated vertical axis A—A of the body. The connector 54 also extends within a cylindrical housing 56 welded or otherwise secured to or formed integrally with the upper portion of the body of the stanchion. The connecting element 54 may be connected to the body by bolts, rivets or other elements 58.

To secure the stanchion 40 relative to the guide tracks "G1" and "G2", upper and lower locking pins 60 and 61 are slideably mounted within housings 62 and 63 which are welded or otherwise secured to or integrally formed with the stanchions adjacent the upper and lower ends thereof. As shown, the housing 62 is positioned adjacent the forward or front flange 42 whereas the housing 63 is positioned more closely to the rear flange 41 of the stanchion. In this manner, the locking pin 61 is generally aligned with the connector element 54 to the carrier and thus is generally axially aligned with the carrier 48 while the housing 62 is offset therefrom. In this manner, the relative spacings of the locking pins 60 and 61 with respect to the central axis A—A of the stanchion are different with respect to one another. In FIG. 5, both of the locking pins are shown in a withdrawn position within the housings 62 and 63, respectively. The two locking pins are connected by a linkage assembly 64 including an upper rod 65 which extends from locking pin 60 to a lower pivot connection 66 with an intermediate connecting rod 67 which is pivotally connected at its opposite end 68 to a lower rod 69 connected to locking pin 61. The intermediate linkage rod 67 is connected to rotate about a central point 70 by operation of a handle or crank 71. By movement of the handle in a clockwise motion, as shown by the arrow in drawing FIG. 5, the linkage assembly will withdraw the locking pins 60 and 61 into the position shown. In this position, the lower rod 69 is positioned to the right side of the central pivot 70 such that any tendency to urge the locking pin 61 downwardly is resisted as the upper locking pin 60 can no longer move with respect to the housing 62, thus preventing the pins from being accidentally extended without manual manipulation of the operating handle 71 in a counterclockwise direction, as shown in FIG. 6.

As shown in FIG. 6, when it is desired to lock the stanchion in position relative to the guide tracks "G1" and "G2", the operating handle 71 is moved counterclockwise, as shown by the arrow, thus extending both the upper and lower pins 60 and 61, respectively, into the openings 30 provided within the guide tracks "G1" and "G2". In this position, the weight of the lower linkage rod applies a constant downward force which urges the locking pins outwardly, thus the pins can not be retracted without manual manipulation of the operating handle 71 in a clockwise motion.

Due to the asymmetric positioning of the locking pins with respect to the elongated central axis A—A of the body 44 of the stanchion, depending upon which flange, 41 or 42, is pivoted toward an element of cargo, such as "C" in FIG. 9, there will be a different spacing developed between the flange and the cargo. Thus, when the stanchion is moved to secure cargo "C" the stanchion is carried by the shuttle or carrier 48 to adjacent the closest opening 30 in the guide track and, thereafter, the stanchion is rotated such that either of the rear or front flanges, 41 or 42, are positioned adjacent a load. The locking pins are thereafter extended by operation of the operating handle 71 so that the stanchions are abutted against the cargo as shown in FIG. 9.

Figures 11, 12, 13, 14:
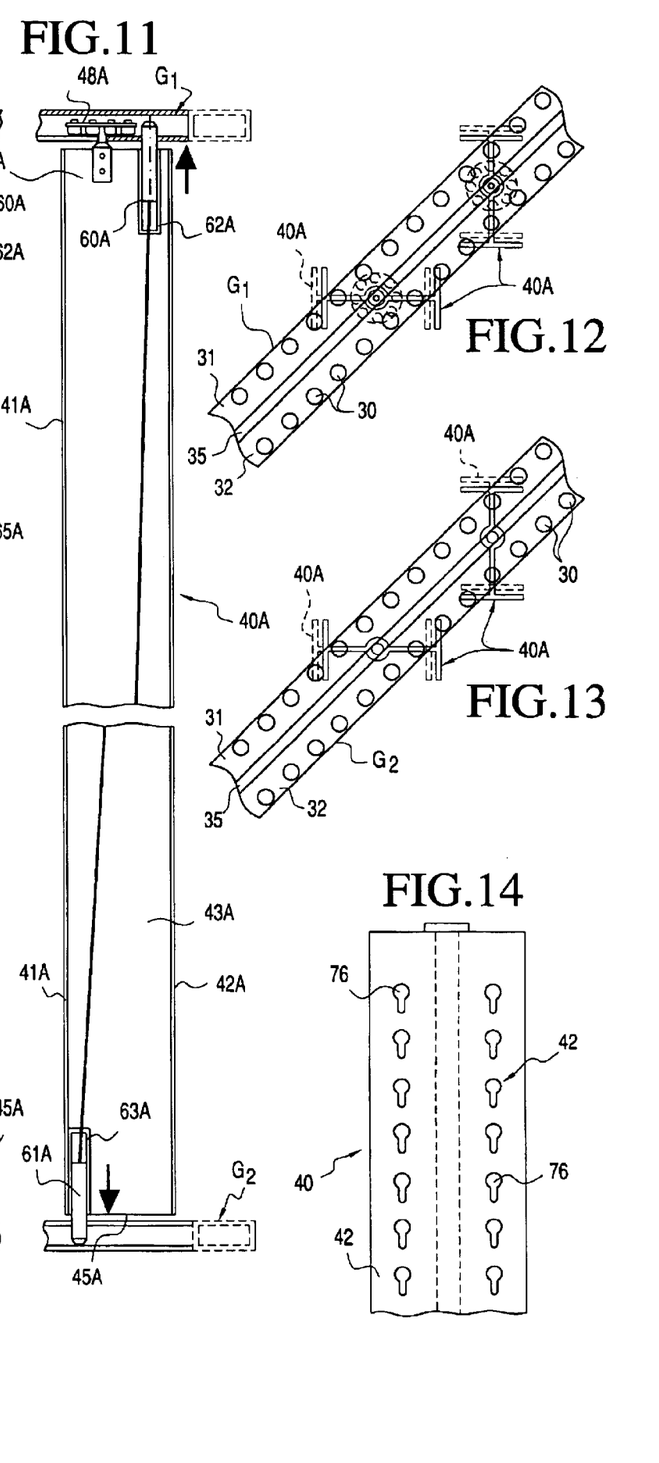
FIG. 11 is a view of the variation of FIG. 10 showing the stanchion being locked into position relative to upper and lower guide tracks of a storage area such as shown in FIG. 1.
FIG. 12 is an illustrational view taken toward the upper guide track showing the relative horizontal displacement of the body of the stanchions of FIGS. 5 and 10 created by rotation of the body through 180° to align the locking pins in different holes in the guide track.
FIG. 13 is an illustrational view similar to FIG. 12 but taken toward the lower guide track.
FIG. 14 is a partial front elevational view of a load engaging flange of the stanchions of the invention.

As shown in FIG. 8, in some embodiments, and as shown in FIG. 1, there are instances when cargo does not align vertically such that the front and rear flanges of the stanchion can not engage a plurality of stacked containers. When this occurs, the present invention utilizes clamp assemblies, such as shown at 75 in drawing FIG. 8. The clamp assemblies will be described in greater detail hereinafter. To mount the clamp assemblies to the flanges 41 or 42 of the stanchion 40, each of the flanges may be provided with a plurality of vertically spaced pairs of keyhole type openings 76, as shown in FIG. 14, which openings receive mounting studs 78 extending from a rear surface of the clamp assembly 75. In this manner, even though a flange 41 or 42 does not engage an article of cargo which is out of vertical alignment, a clamp assembly 75 may be mounted thereto and thereafter adjusted into contacting or abutting relationship to the article of cargo to thereby secure it in position.

Figure 10:
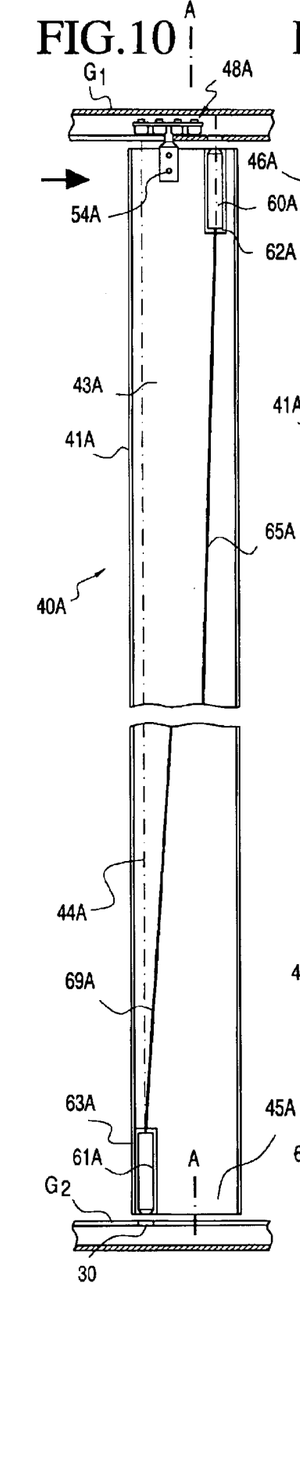
FIG. 10 is a view similar to FIG. 5 of a variation of the embodiment of FIG. 5.

With specific reference to FIGS. 10 and 11, a variation of the embodiment shown in FIGS. 5 and 6 is disclosed. In this embodiment, the elements of the stanchion 40A having the same functional features of the stanchion 40 will have the same reference number with the letter "A". In this embodiment, the stanchion includes a vertically extending body member 44A which, as shown is in an "I" beam configuration having an upper end 46A and lower end 45A from which extend a lower locking pin 61A and upper locking pin 60A. The pins are mounted within lower housing 63A and upper housing 62A. The body of the stanchion is carried by a carrier or shuttle 48A similar to that described with respect to FIG. 5. In this embodiment, however, the connecting element 54A is connected to the upper portion of the body of the stanchion generally centrally between the axes defined by each of the locking pins 61A and 60A such that the locking pins are symmetrical with respect to the carrier. In this embodiment, the locking pin 60A is positioned in somewhat spaced relationship with respect to the forward flange 42A of the stanchion while the lower locking pin 61A is positioned in generally close proximity with respect to the rear flange 41A of the stanchion such that the locking pins are asymmetrical with respect to the body of the stanchion. The locking pins 60A and 61A are extended by a linkage assembly in the same manner as described with respect to the embodiment of FIG. 5 with the operating mechanism not being shown in the drawing figures.

With specific reference to FIGS. 12 and 13, there is an illustration of the possible positioning of the stanchion 40A relative to the upper and lower guide tracks "G1" and "G2". As shown in solid line, the stanchions are positioned in a first orientation, however, by rotating the stanchions substantially 180°, the stanchion is shifted generally horizontally to a second position as shown in dotted line. The asymmetrical design of the stanchion allows placement of the stanchions in both the solid and dotted line portions at each point along the length of the guide tracks and thereby optimizes the position of the stanchion relative to or against cargo.

As with the previous embodiment, the stanchions 40A are provided with a plurality of vertically spaced keyhole openings therein, as shown in FIG. 14, for purposes of mounting clamping assemblies such as shown at 75 in FIG. 8.

With specific reference to FIGS. 15–22, another embodiment of the invention is shown. In this embodiment, the stanchion 40B will be described and the elements which are the same as the embodiments previously described will have the same reference number with the addition of the letter "B". In this embodiment, the stanchion 40B includes a rear cargo engaging flange 41B and a forward cargo engaging flange 42B which are interconnected by a central web 43B. The vertical body 44B of the stanchion includes a lower end 45B and an upper end 46B. A carriage assembly 48B is provided which is essentially the same as that described with respect to the embodiment of FIG. 5. Locking pins 60B and 61B are slideably mounted within upper and lower housings 62B and 63B with the operating pins being connected to a linkage assembly 64B having an upper rod 65B and a lower connecting rod 69B which are interconnected by an intermediate rotational link 67B which is connected to a handle (not shown) but which operates as the handle 71 in FIG. 5.

Figures 15, 16, 17, 18, 19, 20:
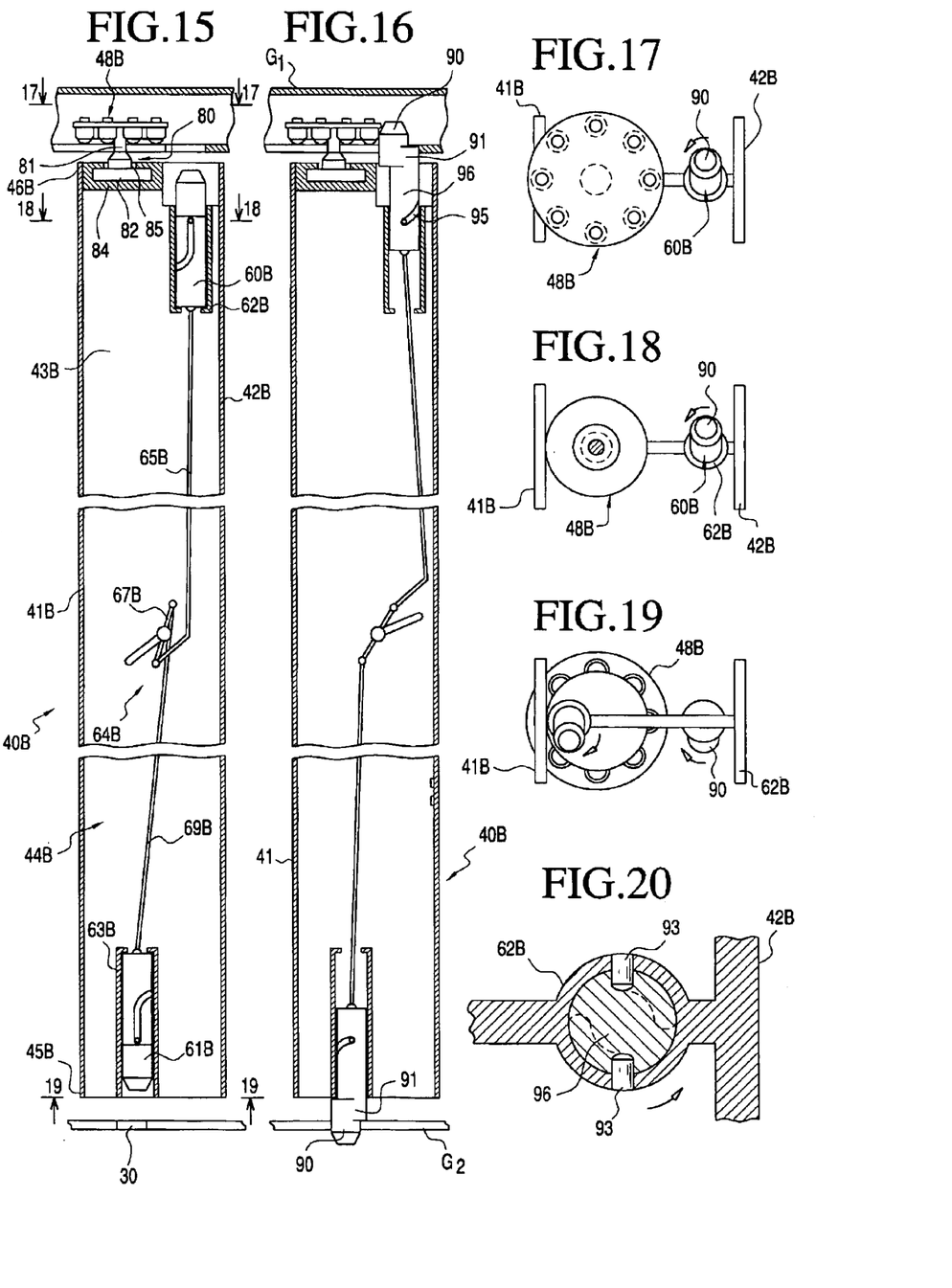
FIG. 15 is a partial cross-sectional side view of a second embodiment of stanchion of the invention having portions broken away and showing the stanchion being moveable relative to upper and lower guide tracks as shown in FIG. 1.
FIG. 16 is a view similar to FIG. 15 showing the stanchion being locked into position relative to the upper and lower guide tracks.
FIG. 17 is a cross-sectional view taken along line 17—17 of FIG. 15 showing a rotational movement of the upper locking pin to provide a camming motion of the stanchion after being locked into position relative to the guide tracks.
FIG. 18 is a cross-sectional view taken along line 18—18 of FIG. 15.
FIG. 19 is a view taken along line 19—19 of FIG. 15.
FIG. 20 is an enlarged cross-sectional view showing the camming surfaces of the locking pins to guide pins of the present embodiment.

In the present embodiment, the body 44B of the stanchion is designed to float or shift relative to the carrier 48B so that a relative movement is permitted therebetween. In this respect, a connector element 80 includes a spindle 81 which extends upwardly and is connected to the carrier 48B. The lower end of the connector element 80 is shown at 82 as being slideably seated within a housing 84 provided at the upper end 46B of the body 44B of the stanchion. A slot 85 is provided through the upper portion of the housing whereby the housing may shift relative to the spindle 81 thereby allowing relative movement between the carrier 48B and the body of the stanchion 44B.

With the present embodiment, the locking pins are specifically designed to provide a camming action to the shift body 44B of the stanchion horizontally after the stanchion is locked into position as shown in FIG. 16, thereby providing an additional degree of horizontal adjustment of the stanchion relative to cargo to be secured. In this respect, each of the locking pins includes an outer end portion 90 which is offset with respect to the axis of the main body of the locking pin by a camming extension 91. Further, guide pins 93, as shown in FIG. 20, extend through the housings 62B and 63B and seat within elongated and curved slots 95 provided in the main body 96 of each locking pin. As shown in FIG. 15 with respect to the lower locking pin 61B, the slots 95 extend generally vertically along the length of the main body 96 of each locking pin and then curve generally horizontally to thereby provide a camming action to rotate the locking pins due to the guidance of the guide pins 93 riding in the slots 95. As the pins are extended vertically, they will initially enter into the openings 30 within the upper and lower guide tracks "G1" and "G2" and thereby initially anchor the stanchions in position relative to the guide tracks.

Thereafter, continued extended movement of the locking pins outwardly will cause the guide pins 93 to ride within the horizontal portion of the slots 95 and thereby rotate the pins about their axes thereby camming the body 44B of the stanchion to the right as shown in drawing FIGS. 15 and 16. The floating connecting arrangement between the body of the stanchion and the carrier 48B allows the entire stanchion to be urged forwardly by the pivotal movement and camming action of the locking pins 60B and 61B thereby providing a further horizontal adjustment to engage the stanchion with respect to an article of cargo. The linkage mechanism 64B will ensure that the locking pins remain extended when extended and retracted when retracted, as was previously discussed with respect to the embodiment of FIG. 5. The relative rotation and camming action of the locking pins 60B and 61B are illustrated in FIGS. 17–19 taken from above and below the stanchion.

Figures 21, 22, 23:
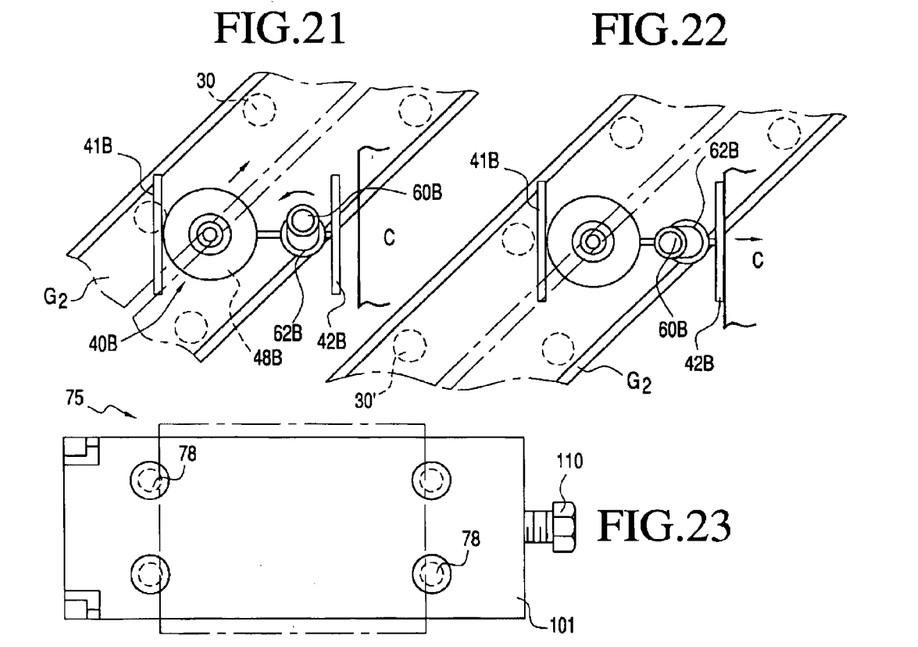
FIG. 21 is a top plan illustrational view showing the embodiment of FIG. 15 being locked into position to the upper guide track relative to an element of cargo prior to camming the stanchion to its final position.
FIG. 22 is a view similar to FIG. 21 showing the position of the stanchion after being cammed into engagement with the element of cargo.
FIG. 23 is a rear elevational view of a clamp assembly used in accordance with the invention.
Figure 24:
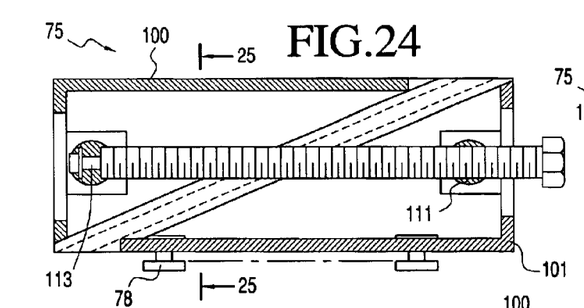
FIG. 24 is cross-sectional view through the clamp assembly of FIG. 23.

With specific reference to FIGS. 21 and 22, the stanchion 40B is shown in FIG. 21 in initially locked position relative to an article of cargo "C". After being initially locked into position with the locking pins 60B and 61B the pins are rotated as the extension mechanism is operated to further extend the locking pins. The relative rotation and camming action of the pin 60B is shown by the arrow. As the pin cams or rotates counterclockwise relative to the housing 62B, the entire stanchion is shifted to the right as shown in the drawing figures to the position of FIG. 22 wherein the flange 42B of the stanchion abuts the cargo.

With the present invention, a further degree of horizontal adjustment for ensuring secure abutment of a stanchion against an article of cargo is provided. By altering the degree of offset or camming created by the offset of the end portion 90 of each of the locking pins relative to the main body portions 96 thereof, the degree of horizontal movement can be controlled.

As with the previous embodiments, each of the flanges 41B and 42B are provided with a plurality of pairs of vertically spaced keyhole shaped holes 76 for purposes of mounting a clamp assembly, such as shown in FIG. 14. As previously described, often, vertically stacked articles of cargo are not vertically aligned and therefore even though the cargo engaging flanges of the stanchion abut one or more articles of cargo stacked vertically, other articles in the stack may be out of alignment and therefore not securely engaged. By mounting the clamp assembly 75 to the stanchion and adjusting the clamp assembly relative to the offset cargo, such offset cargo is positively engaged and retained in position.

With specific reference to FIGS. 23–26, one form of clamp assembly 75 is described. It should be noted that other extendible clamp assemblies may be utilized with the stanchions of the present invention.

In the embodiment shown, each clamp 75 includes a plurality of the support pins 78 as is discussed with respect to the embodiment shown in FIG. 8. The mounting pins 78 include enlarged heads such that the pins may be inserted within the keyhole shaped openings provided in the flanges of the stanchions as previously described. Thereafter, the locking pins are moved vertically downwardly to lock the clamp assemblies to the stanchions. The enlarged heads prevent the withdrawal of the clamp once mounted to the stanchion.

Figure 25:
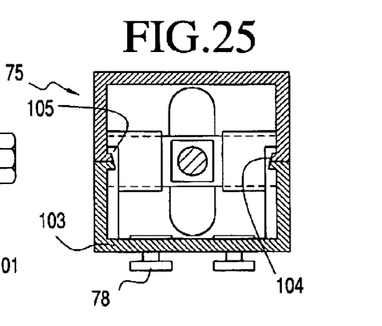
FIG. 25 is a cross-sectional view taken along lines 25—25 of FIG. 24.
Figure 26:
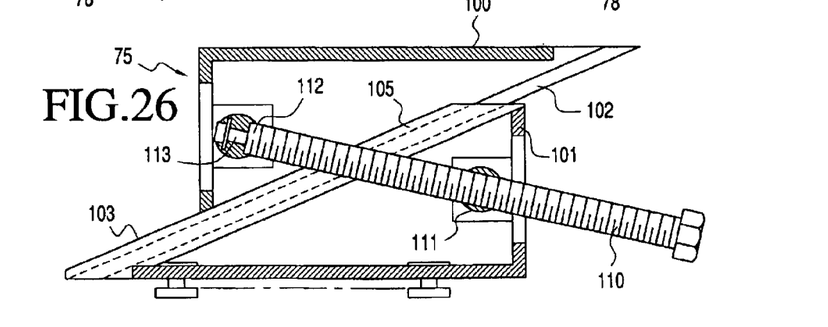
FIG. 26 is a view similar to FIG. 24 showing the clamp assembly expanded.

Each clamp 75 is provided with a pair of wedge elements 100 and 101 which are slideably relative to one another along their diagonal faces 102 and 103, respectively. As shown, the diagonal face 102 of wedge member 100 includes opposing ridges 104 which slide within u-shaped channels 105 defined by the edges of the surface 103, as is shown in FIG. 25. The mounting pins 78 extend from a rear surface of the wedge member 101. To extend the wedge 100 outwardly with respect to the wedge 101, a bolt 110 is mounted through a pivotable joint 111 secured to the wedge 101 and the bolt extends to a distal end 112 pivotably mounted to the wedge 101 as shown at 113. By adjusting the bolt relative to the threaded pivot joint ill, the wedge 100 is moved relative to the wedge 101 to thereby expand the clamp. Therefore, when the clamp assembly is mounted to a stanchion, the wedge 100 can be moved outwardly horizontally to engage cargo which is not properly aligned with other cargo in a vertical stack.

Figure 27:
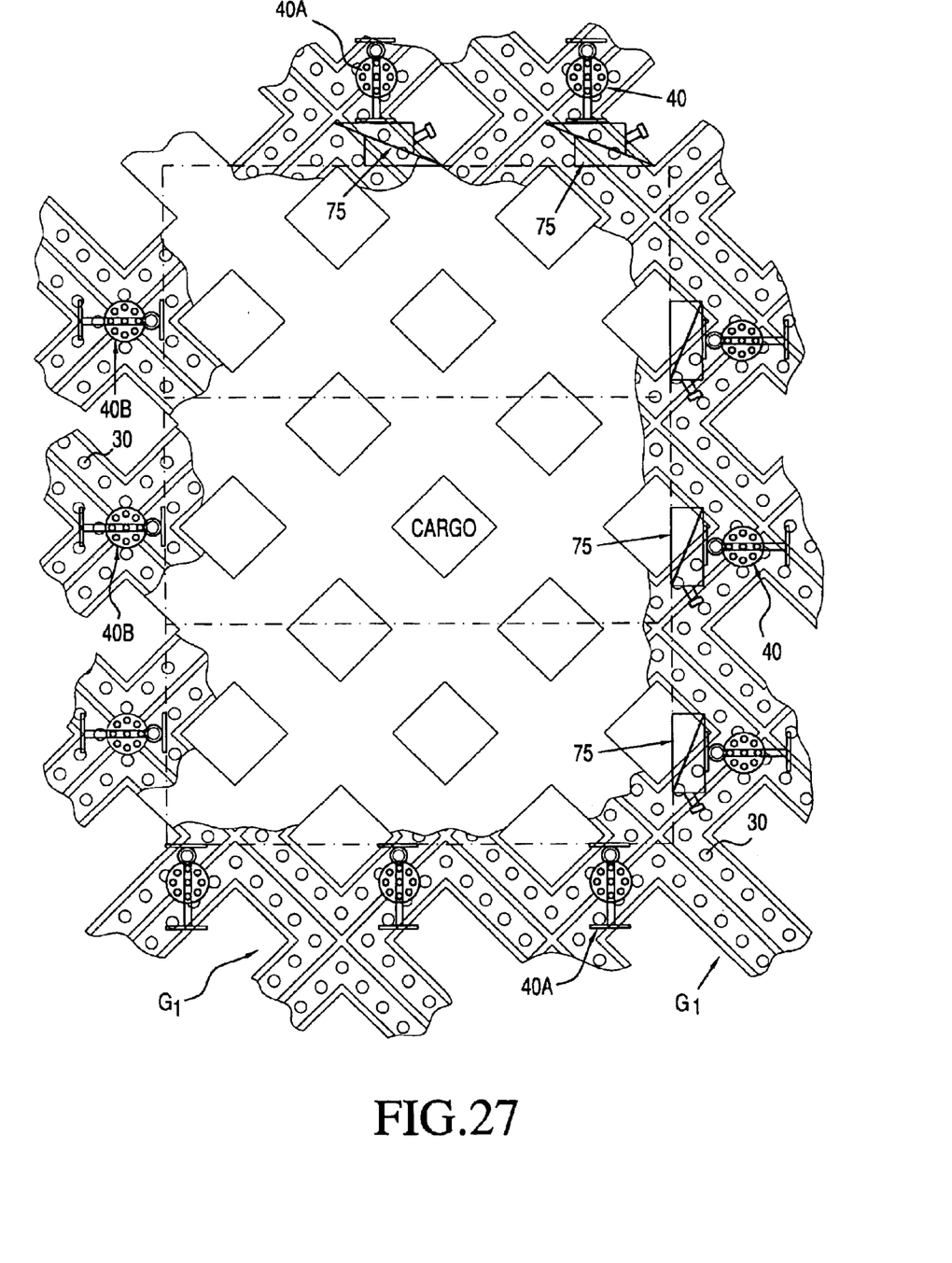
FIG. 27 is a top illustrational view showing the stanchions of the invention mounted in guide tracks similar to those shown in FIG. 1 which are arranged in generally parallel and crossing relationship in a grid pattern and showing the clamps disclosed in FIGS. 22–26 used to secure cargo in cooperation with the stanchions.

With specific reference to FIG. 27, a top plan view of a cargo storage area is shown with the upper guide track "G1" being oriented in a square grid pattern. A plurality of stanchions 40, 40A, 40B are shown as being maneuvered and locked into place relative to the cargo "C" in surrounding relationship therewith. In some instances, clamps such as shown at 75 are mounted to the stanchions in order to engage non-aligned elements of cargo.

In adjusting the stanchions of the present invention, the stanchions are moved along the guide tracks "G1" and "G2" until they are initialed locked into position. Utilizing the embodiments of stanchions 40 and 40A relative stepwise rotation of the stanchions may be used to maneuver the flange engaging surface of the stanchion more closely to cargo to be secured. Utilizing the stanchion of 40B, the stanchion is initially locked into place and thereafter cammed horizontally into a secure engagement with the cargo to be secured as previously described.

The foregoing description of the preferred embodiment of the invention has been presented to illustrate the principles of the invention and not to limit the invention to the particular embodiment illustrated. It is intended that the scope of the invention be defined by all of the embodiments encompassed within the application including the claims and their equivalents.

We claim:

1. A stanchion for use with a guide track system for supporting the stanchion, the stanchion including a carrier moveable along the guide track system, a body of the stanchion extending vertically and being connected to the carrier by a connecting element positioned at a point which is offset with respect to a generally central vertical axis of said body, said body having upper and lower ends, upper and lower locking means carried by said body adjacent said upper and lower ends, said upper and lower locking means being spaced on different sides of said central vertical axis, means for selectively extending said locking means outwardly relative to said upper and lower ends so as to engage with the guide track system, said body having oppositely oriented vertically extending cargo contacting surfaces which are spaced on opposite sides of the connecting element, said body being selectively rotated relative to the guide track system to thereby position one of said cargo contacting surfaces relative to cargo to be secured.

2. The stanchion of claim 1 in which said body is mounted so as to be relatively moveable with respect to said carrier, and means for shifting said body horizontally relative to said carrier.

3. The stanchion of claim 2 in which said locking means include extendable locking pins having offset outer ends, and said means for shifting including means for rotating said locking pins so as to shift said body relative to the guide track system as said locking pins are extended and rotated relative to said upper and lower ends of said body of the stanchion.

4. The stanchion of claim 1 in which a first of said locking means is mounted at a first distance from one of said cargo contacting surfaces and a second of said locking means is mounted at a second distance which is different than said first distance from the other of said cargo contacting surfaces.

5. The stanchion of claim 1 in which at least one of said cargo contacting surfaces includes a plurality of vertically spaced openings therethrough, and at least one horizontally adjustable clamp assembly selectively mounted to said spaced openings.

6. The stanchion of claim 1 including an adjustable clamp assembly, and means for securing said clamp assembly to one of said oppositely oriented cargo contacting surfaces of said body of the stanchion.

7. The stanchion of claim 4 wherein said second locking means is extendable along a vertical line passing generally through said point.

8. The stanchion of claim 1 wherein said upper and lower locking means are symmetrically spaced on opposite sides relative to a vertical line extending through said point.

9. The stanchion of claim 1 wherein said locking means are asymmetrically positioned on opposite sides of and relative to said central vertical axis.

10. A stanchion for use with a guide track system including upper and lower guide tracks for guiding the stanchion, the stanchion including at least one carrier moveable along one of the upper and lower guide tracks of the guide track system, a body extending vertically and being supported by said at least one carrier, said body having upper and lower ends, locking means mounted adjacent said upper and lower ends, means for selectively extending said locking means outwardly relative to said upper and lower ends so as to engage with the upper and lower guide tracks of the guide track system to retain the stanchion relative to the guide track system, said body having a generally central vertical axis, said body having oppositely oriented cargo contacting surfaces which are spaced at different distances relative to a vertical line extending centrally through a point of connection of said body and said at least one carrier, and said body being selectively rotatable relative to the upper and lower guide tracks to thereby position one or the other of said oppositely oriented cargo contacting surfaces in different spaced opposing relationships relative to cargo to be secured.

11. The stanchion of claim 10 in which said body is mounted so as to be relatively moveable with respect to said carrier, and said locking means including means for shifting said body horizontally relative to the guide track system.

12. The stanchion of claim 11 in which said locking means include extendable locking pins, and said means for shifting including cam means associated with each locking pin for camming said locking pins by rotation thereof so as to shift said body as said locking pins are extended relative to said upper and lower ends of said body of the stanchion.

13. The stanchion of claim 12 in which said body is mounted to said carrier offset with respect to said central vertical axis of said body.

14. The stanchion of claim 10 in which at least one of said cargo contacting surfaces includes a plurality of vertically spaced openings therethrough, and a horizontally adjustable clamp mounted to selected ones of said openings.

15. The stanchion of claim 14 wherein said adjustable clamp includes first and second wedge shaped members having opposing and slidably engaging diagonal surfaces and oppositely oriented outer faces, means extending from said outer face of said first wedge shaped member for mounting within said selected ones of said openings in said at least one of said cargo contacting surfaces, and means for sliding said first and second wedge shaped members relative to one another along said diagonal surfaces to thereby selectively change a spacing between said oppositely oriented outer faces.

16. The stanchion of claim 10 wherein each locking means includes a pin reciprocally mounted within housings adjacent said upper and lower ends of said body, and said means for selectively extending said locking means including a linkage system operatively connected to an operating handle whereby said pins are operatively extended and retracted simultaneously relative to the guide track system.

17. The stanchion of claim 16 wherein said linkage system includes means for automatically mechanically retaining said pins in both extended and retracted positions unless released by movement of said operating handle.

18. The stanchion of claim 16 wherein each of said pins includes a main body pivotally mounted within one of said housings and an offset outer end extending from said main body, and means for rotating said pins as they are extended and retracted relative to said housings.

19. The stanchion of claim 18 wherein said means for rotating includes a cam track formed in each of said housings and guide means carried by each of said pins and slidably seated within said cam tracks.

20. A cargo storage system including a guide track system and a plurality of stanchions, said guide track system including an upper guide track and a lower guide track which are to be aligned with one another, each guide track including a central open passageway defined between spaced flanges having a plurality of generally equally spaced openings therein, each of said stanchions including a carrier mounted within at least one of said upper and lower guide tracks and moveable along said at least one upper and lower guide track, each stanchion including a body extending vertically and being connected to said carrier by a connecting element positioned at a point which is offset with respect to a generally centrally vertical axis of said body, each body having upper and lower ends, upper and lower locking means carried by each body adjacent said upper and lower ends, said upper and lower locking means being spaced on different sides of said central vertical axis, said upper and lower locking means including pin members, means for selectively extending said pin members outward relative to said upper and lower ends so as to be engageable within said spaced openings in said upper and lower guide tracks, each body having oppositely oriented vertically extended cargo contacting surfaces, and each body being selectively rotatable relative to said upper and lower guide tracks to thereby position one of said cargo contacting surfaces relative to cargo to be secured.

* * * * *